US008867386B2

(12) United States Patent
Sampath et al.

(10) Patent No.: US 8,867,386 B2
(45) Date of Patent: Oct. 21, 2014

(54) MULTIUSER SCHEDULING IN WLAN SYSTEMS

(75) Inventors: Hemanth Sampath, San Diego, CA (US); Sameer Vermani, San Diego, CA (US); Didier Johannes Richard Van Nee, De Meern (NL); Santosh Paul Abraham, San Diego, CA (US); Albert Van Zelst, Woerden (NL)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 13/110,967

(22) Filed: May 19, 2011

(65) Prior Publication Data

US 2011/0216659 A1 Sep. 8, 2011

Related U.S. Application Data (62) Division of application No. 12/538,535, filed on Aug. 10, 2009.

(60) Provisional application No. 61/223,319, filed on Jul. 6, 2009.

(51) Int. Cl.
*G01R 31/08* (2006.01)
*H04W 72/12* (2009.01)
*H04W 88/08* (2009.01)
*H04B 7/04* (2006.01)

(52) U.S. Cl.
CPC ............ *H04W 72/121* (2013.01); *H04W 88/08* (2013.01); *H04B 7/0452* (2013.01); *H04B 7/0417* (2013.01)
USPC ....................................................... 370/252

(58) Field of Classification Search
USPC .............. 370/310, 310.2, 312, 315, 329, 331, 370/332, 248, 252, 328, 338
See application file for complete search history.

(56) References Cited

U.S. PATENT DOCUMENTS

| 5,345,599 | A | 9/1994 | Paulraj et al. |
| 7,035,660 | B2 | 4/2006 | Futakata et al. |
| 7,177,279 | B2 * | 2/2007 | Kataria ......................... 370/235 |
| 7,519,371 | B2 | 4/2009 | Nanda et al. |
| 7,706,824 | B2 | 4/2010 | Schulist et al. |
| 7,933,560 | B2 | 4/2011 | Han et al. |
| 8,102,802 | B2 | 1/2012 | Ratasuk et al. |
| 8,208,364 | B2 | 6/2012 | Walton et al. |
| 2002/0177447 | A1 * | 11/2002 | Walton et al. ................. 455/452 |

(Continued)

FOREIGN PATENT DOCUMENTS

| CN | 1926781 A | 3/2007 |
| CN | 101388699 A | 3/2009 |

(Continued)

OTHER PUBLICATIONS

International Search Report and Written Opinion—PCT/US2010/041104—ISA/EPO—Apr. 6, 2011.

(Continued)

*Primary Examiner* — Anh Ngoc Nguyen
(74) *Attorney, Agent, or Firm* — Steven R. Thiel (57) ABSTRACT

An apparatus for wireless communications is provided including a processing system. The processing system is configured to determine path-losses between the apparatus and a plurality of wireless nodes, to group the plurality of wireless nodes into sets based on the determined path-losses, and to exchange data with at least one of the wireless nodes in one of the sets.

21 Claims, 5 Drawing Sheets (56) References Cited

U.S. PATENT DOCUMENTS

| | | |
|---|---|---|
| 2004/0082356 A1 | 4/2004 | Walton et al. |
| 2004/0166835 A1 | 8/2004 | Johansson et al. |
| 2008/0049692 A1 | 2/2008 | Bachu et al. |
| 2008/0080634 A1 | 4/2008 | Kotecha et al. |
| 2008/0227388 A1 | 9/2008 | Popovski et al. |
| 2008/0267168 A1 | 10/2008 | Cai et al. |
| 2008/0273515 A1 | 11/2008 | Stopler et al. |
| 2009/0116420 A1 | 5/2009 | Jeong et al. |
| 2009/0291691 A1 | 11/2009 | Jeong et al. |
| 2011/0002227 A1 | 1/2011 | Sampath et al. |
| 2011/0105170 A1 | 5/2011 | Gan et al. |

FOREIGN PATENT DOCUMENTS

| | | |
|---|---|---|
| JP | 2006101517 A | 4/2006 |
| JP | 2008211737 A | 9/2008 |
| JP | 2009033717 A | 2/2009 |
| KR | 20090027614 A | 3/2009 |
| WO | 2004039011 | 5/2004 |
| WO | WO-2004038984 A2 | 5/2004 |
| WO | WO-2005079027 A1 | 8/2005 |
| WO | WO2008024631 | 2/2008 |
| WO | 2008113966 A1 | 9/2008 |

OTHER PUBLICATIONS

Partial International Search Report—PCT/US2010/041104—International Search Authority, European Patent Office, Nov. 12, 2010.

European Search Report—EP12008013—Search Authority—The Hague—Jan. 22, 2013.

* cited by examiner

MULTIUSER SCHEDULING IN WLAN SYSTEMS

CROSS-REFERENCE TO RELATED APPLICATION(S)

The present application for patent is a Divisional of patent application Ser. No. 12/538,535 entitled "MULTIUSER SCHEDULING IN WLAN SYSTEMS" filed Aug. 10, 2009, pending, which claims priority to U.S. Provisional Application Ser. No. 61/223,319 filed on Jul. 6, 2009, the contents of which are hereby incorporated by reference herein in their entirety.

BACKGROUND

1. Field

The following description relates generally to communication systems, and more particularly to multiuser scheduling in wireless local area network (WLAN) systems.

2. Introduction

In a multiuser communication system, determining which users to group together for multiuser transmissions is advantageous, as the performance of the multiuser communication system can be highly dependent on the choice of users that are scheduled together for the multiuser transmissions. A solution using channel state information (CSI) for all users can provide an optimal solution, but is a computational burden on the hardware of the multiuser communication system. As such, a need exists for a multiuser communication system and a method that efficiently and effectively determines multiuser scheduling.

SUMMARY

In an aspect of the disclosure, an apparatus for wireless communications is provided including a processing system. The processing system is configured to determine path-losses between the apparatus and a plurality of wireless nodes, to group the plurality of wireless nodes into sets based on the determined path-losses, and to exchange data with at least one of the wireless nodes in one of the sets.

In an aspect of the disclosure, an apparatus for wireless communications is provided including a processing system. The processing system is configured to determine transmission times of a plurality of wireless nodes, to group the plurality of wireless nodes into sets based on the determined transmission times, and to exchange data using a multi-user multiple-input and multiple-output transmission with at least one of the wireless nodes in one of the sets. The processing system is configured to group the plurality of wireless nodes into sets such that each of the sets comprises wireless nodes with approximately equal transmissions times.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the novel systems, apparatus, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Figure 1:
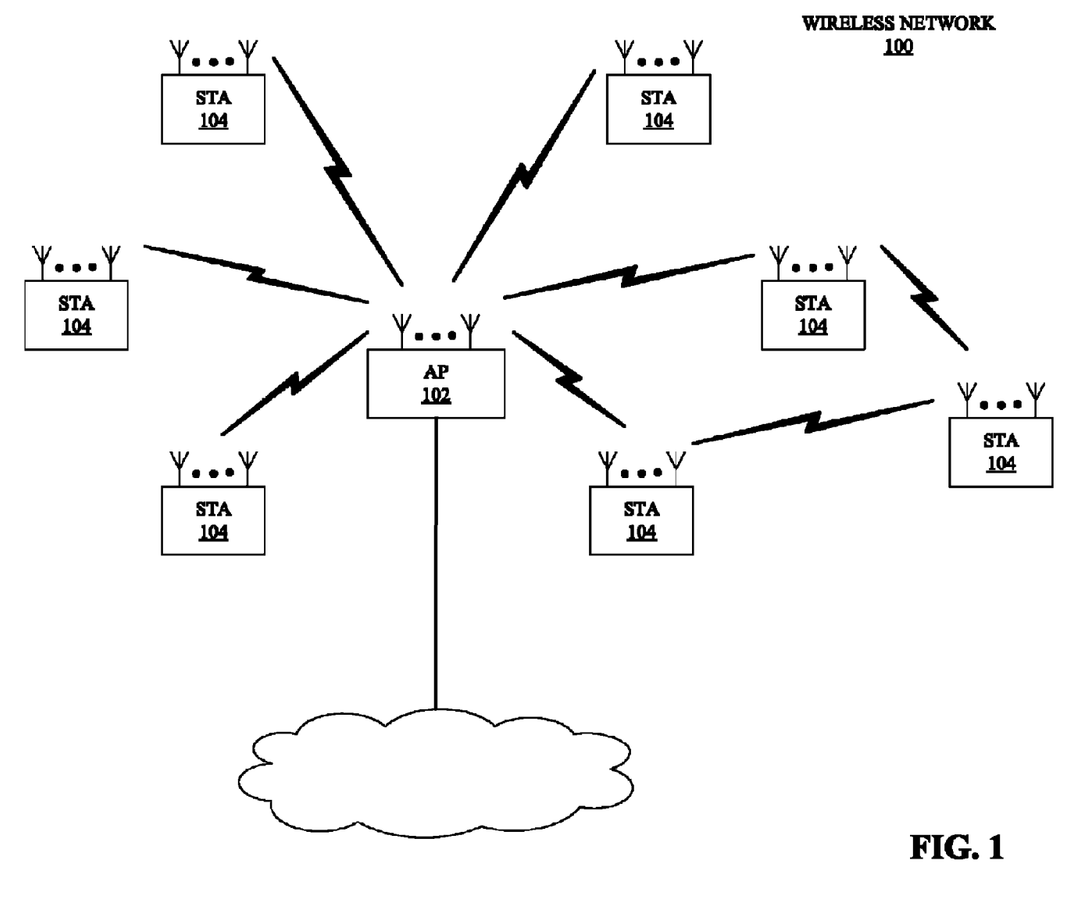
FIG. 1 is a conceptual block diagram illustrating an exemplary wireless network supporting communications between multiple apparatuses.

Several aspects of a wireless network will now be presented with reference to FIG. 1. The wireless network 100 may support any number of apparatuses. In this example, each apparatus is implemented as a wireless node. A wireless node may be an access point (AP) or a station (STA). In one configuration of a wireless network 100, several APs 102 may be distributed throughout a geographic region to provide coverage for the STAs 104. An AP 102 is generally a fixed terminal that provides backhaul services to the STAs 104 in the geographic region of coverage. However, the AP 102 may be mobile in some applications. A STA 104, which may be fixed or mobile, utilizes the backhaul services of an AP 102 or engages in peer-to-peer communications with other STAs 104. Examples of a STA include a mobile telephone, a laptop computer, a personal digital assistant (PDA), a mobile digital audio player, a mobile game console, a digital camera, a digital camcorder, a mobile audio device, a mobile video device, a mobile multimedia device, or any other suitable device capable of supporting wireless communications.

An AP or STA may be referred to by those skilled in the art by different nomenclature. By way of example, an AP may be referred to as a base station, a base transceiver station, a wireless device, a terminal, a node, or some other suitable terminology. Similarly, a STA may be referred to as a user terminal, a mobile station, a subscriber station, a wireless device, a terminal, an access terminal, a node, or some other suitable terminology. The various concepts described throughout this disclosure are intended to apply to all suitable apparatuses regardless of their specific nomenclature.

The wireless network 100 may support open-loop or closed-loop single-input and single-out (SISO) technology, single-input and multiple-output (SIMO) technology, multiple-input and single-output technology (MISO), and/or multiple-input and multiple-output (MIMO) technology. Single-input refers to the use of only one antenna at the transmitter, whereas multiple-input refers to the use of multiple antennas at the transmitter. Single-output refers to the use of only one antenna at the receiver, whereas multiple-output refers to the use of multiple antennas at the receiver. Accordingly, MIMO technology refers to the use of multiple antennas at both the transmitter and the receiver. Using MIMO technology, an AP 102 may communicate with multiple STAs 104 simultaneously using Spatial Division Multiple Access (SDMA). SDMA is a multiple access scheme which enables multiple streams transmitted to different receivers at the same time to share the same frequency channel and, as a result, provide higher user capacity. The scheme is achieved by spatially precoding each data stream and then transmitting each spatially precoded stream through a different transmit antenna on the downlink. The spatially precoded data streams arrive at the STAs 104 with different spatial signatures, which enables each STA 104 to recover the data stream destined for that STA 104. On the uplink, each STA 104 transmits a spatially precoded data stream, which enables the AP 102 to identify the source of each spatially precoded data stream.

One or more STAs 104 may be equipped with multiple antennas to enable certain functionality. With this configuration, multiple antennas at the STA 104 may be used to communicate with a multiple antenna AP 102 to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the AP 102 may also be configured to support STAs 104 that do not support MIMO technology. This approach may allow older versions of STAs 104 (i.e., "legacy" STAs) to remained deployed in a wireless network, extending their useful lifetime, while allowing newer MIMO STAs to be introduced as appropriate.

In the detailed description that follows, various aspects of the invention will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
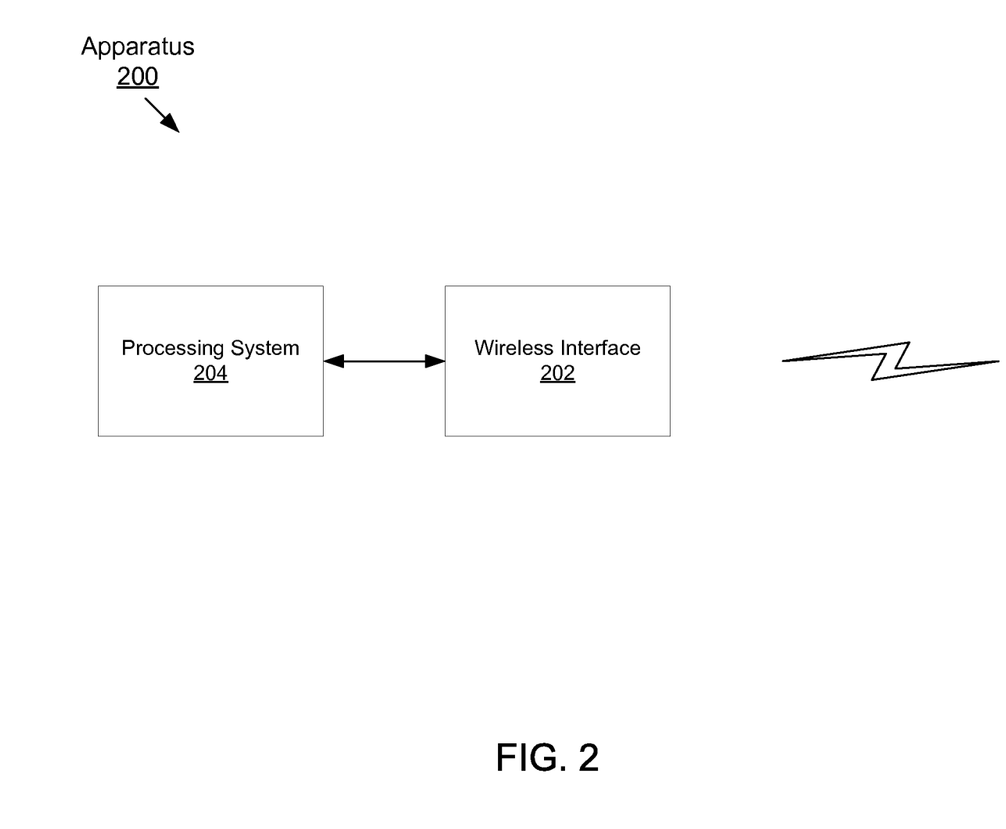
FIG. 2 is a conceptual block diagram illustrating the hardware configuration for an exemplary apparatus.

Various aspects of an AP will now be presented with reference to FIG. 2. FIG. 2 is a conceptual block diagram illustrating a hardware configuration for an apparatus. The apparatus 200 may include a wireless interface 202 and a processing system 204.

The wireless interface 202 may be a transceiver having a transmitter and receiver to support two-way communications over the wireless medium. Alternatively, the wireless interface 202 may be configured as a transmitter or receiver to support one-way communications. In the detailed description that follows, a wireless interface may be described as a transmitter or a receiver to illustrate a particular aspect of the invention. Such a reference does not imply that the wireless interface is incapable of performing both transmit and receive operations.

The wireless interface 202 may support may support different air interface protocols. By way of example, the wireless interface 202 may include a transmitter and/or a receiver that supports IEEE 802.11n, or the proposed successor to IEEE 802.11n, which is sometimes referred to as VHT (Very High Throughput), or some other suitable air interface protocol. In this example, the wireless interface may include multiple transmit and receive antennas (not shown) to support SDMA communications.

The wireless interface 202 may also be configured to implement the physical layer by modulating wireless signals and performing other radio frequency (RF) front end processing. Alternatively, the physical layer processing function may be performed by the processing system 204. In at least one configuration of an apparatus, the wireless interface 202 may be integrated into the processing system 204, or distributed across multiple entities in the apparatus.

The processing system 204 may be implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, or any other suitable entities that can perform calculations or other manipulations of information.

The processing system 204 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 102 to perform the various functions described below, as well as other protocol processing functions (e.g., data link layer processing).

Machine-readable media may include storage integrated into one or more of the processors. Machine-readable media may also include storage external to the one or more processor, such as a random access memory (RAM), a flash memory, a read only memory (ROM), a programmable ROM (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

Figure 3:
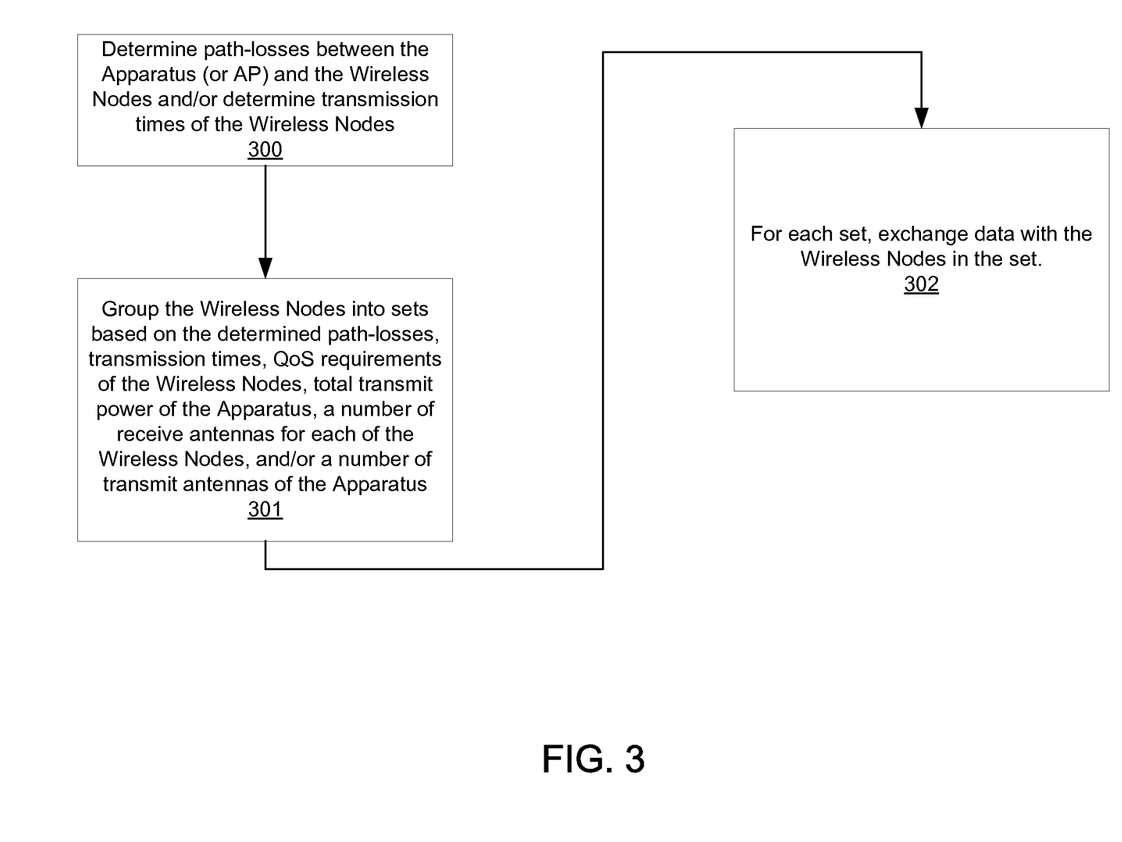
FIG. 3 is a conceptual flow diagram illustrating the functionality of a processing system in an exemplary apparatus.

FIG. 3 is a conceptual flow diagram illustrating the functionality of a processing system in an exemplary apparatus. As described supra, in a multiuser communication system, determining which users to group together for a multiuser transmission is advantageous. Use of CSI provides an optimal solution, but is a computational burden on the apparatus. To provide an efficient and effective grouping solution, the processing system 204 may determine which STAs 104 to group together for transmission based on a variety of factors, including by way of example, the path-losses and/or transmission times of the STAs 104. The grouping solution can reveal scenarios where the downlink (DL) power allocation problem need not be solved, i.e., where equal power allocation can be used without much performance loss, thereby enabling lower complexity precoding schemes.

Referring to FIGS. 1-3, the processing system 204 may determine path-losses between the AP 200 and the STAs 104 (300). A path loss is a reduction in power density (attenuation) of an electromagnetic wave as it travels through space. Each of the STAs 104 may have a different path loss, which may be used by the processing system 204 to determine how to group the STAs 104 together for simultaneous transmission. For example, in one configuration, the processing system 204 may group the STAs 104 into sets such that a difference in a determined path-loss between any two STAs 104 in each of the sets is less than a defined threshold. Alternatively, in a second configuration, the processing system 204 may group the STAs 104 into sets such that a STA A' with a high determined path-loss and low quality of service (QoS) requirements is grouped with one or more STAs B' with a low determined path-loss such that the QoS requirements of both the STA A' and the one or more STAs B' may be satisfied during transmission.

Alternatively or in addition, the processing system 204 may determine the transmission times of the STAs 104 (300). A transmission time is the amount of time needed for a particular STA 104 to receive the requisite data. The processing system 204 may utilize the transmission times of the STAs 104 to determine how to group the STAs 104 together for simultaneous transmission. For example, in one configuration, the STAs 104 may be grouped into sets such that each of the sets includes STAs 104 with approximately equal transmission times. In a second configuration, the STAs 104 may be grouped into sets such that each of the sets includes STAs 104 with QoS requirements and path-losses that would likely provide for approximately equal transmission times. In a third configuration, the STAs 104 may be grouped into sets such that each of the sets includes STAs 104 with a number of receive antennas and QoS requirements that would likely provide for approximately equal transmission times. In a fourth configuration, the STAs 104 may be grouped into sets such that each of the sets includes STAs 104 that require approximately equal transmit power allocation. In a fifth configuration, the power for transmission is allocated such that transmission times are approximately equal for the STAs 104 in each of the sets. In a sixth configuration, the STAs 104 may be grouped into sets such that each of the sets includes STAs 104 that, when transmitting, result in an approximately equal received power at a receiver of the wireless interface 202.

The processing system 204 may also be configured to group the STAs 104 into sets such that each of the sets includes STAs 104 with a similar traffic class. The traffic class may be conversational, streaming, interactive, or background. The conversational traffic class refers to the traffic generated mostly from real-time applications that usually require a constant bit rate during the course of communications. Typical examples are voice and videoconferencing, and some network games. The streaming traffic class usually requires a preserved time relation between the information entities and the stream. The streaming traffic class includes streaming audio and video over the Internet. The interactive traffic class refers to the traffic generated from applications such as web browsing and Internet games. The background traffic class includes delay insensitive applications such as e-mail or FTP downloads.

Upon determining the path-losses and/or the transmission times of the STAs 104, the processing system 204 groups the STAs 104 into sets based on the determined path-losses and/or transmission times (301). In addition, the processing system 204 may group the STAs 104 into sets based on QoS requirements, such as transmission delay requirements associated with each of the STAs 104, a buffer status of the apparatus 200, and/or a data rate metric associated with each of the STAs 104 (301). When using a multi-user MIMO transmission with a precoding of an equal power allocation to spatial streams of the STAs 104, the processing system 204 may group the STAs 104 into sets based on satisfying QoS requirements for each of the STAs 104 in the sets. Furthermore, the processing system 204 may group the STAs 104 into sets based on total transmit power of the apparatus 200, a number of receive antennas for each for each of the STAs 104, and/or a number of transmit antennas of the apparatus 200 (301).

After the processing system 204 groups the STAs 104 into sets, for each of the sets, the processing system 204 exchanges data with the STAs 104 in the set (302). In one configuration, the processing system 204 receives the data through a receiver in the wireless interface 202 from the STAs 104 in the set (which transmit simultaneously to the receiver). In such a configuration, the STAs 104 in the set are scheduled to transmit simultaneously for reception by the receiver. In another configuration, the processing system provides the data to a transmitter in the wireless interface 202 to be transmitted simultaneously to the STAs 104 in the set (302). For example, if an AP is in communication with STAs A, B, C, and D, the processing system may group STA A and C into one set and STA B and D into another set based on any one of or a combination of the aforementioned metrics. The processing system then transmits, via the transmitter, to STAs A and C simultaneously and to STAs B and D simultaneously.

In the example above, each of the STAs A, B, C, and D were grouped into one set. However, any of the STAs may be grouped into more than one set if the aforementioned metrics dictate such a solution. Furthermore, one STA may be grouped into a set without any other STAs for a single-user transmission. As such, the transmission may be a single-user transmission or a multi-user MIMO transmission. The single-user transmission may be open-loop MIMO, open-loop SISO, closed-loop MIMO, or closed-loop SISO, or any variant thereof. When the processing system 204 groups only one STA 104 into a set without other STAs 104, the processing system 204 may make this determination based on the path-loss between the apparatus 200 and the one STA 104, QoS requirements of the one STA 104, the total transmit power of the apparatus 200, a number of receive antennas for the one STA 104, or a number of transmit antennas of the apparatus 200. The QoS requirements of the one STA 104 include transmission delay requirements associated with the one STA 104, a buffer status of the apparatus 200, a data rate metric of the one STA 104, or any combination thereof.

As described herein, the processing system 204 is the means for determining metrics related to the STAs and the apparatus (or AP), the means for grouping the STAs based on the metrics, and the means for providing data to a transmitter for transmission to the STAs in each of the sets.

As discussed supra, the processing system 204 may group only one STA into a set without other STAs. In such a grouping, the transmission to the one STA does not contain data for other STAs. The following is a heuristic to decide when a STA is sent data using single-user beamforming (rather than using SDMA): Schedule the far off STA alone when the path-loss is equal to 105 dB and the packet size is greater than 60% of the packet size of close by users or when the path-loss is greater than 105 dB. Those of ordinary skill in the art would understand that with changes in the network parameters, the heuristic may be dependent on a path-loss that is less than or greater than 105 dB.

The following is a heuristic to decide when equal power allocation is sufficient: Use equal power based MMSE precoding for SDMA when the low path-loss user has the highest data rate requirement. The exact path-loss and data rate difference between this user and the higher path-loss, lower data rate users required for choosing equal power MMSE precoding can be empirically estimated through simulations. The heuristic is dependent on a number of antennas at the AP and the number of receive antennas at the STAs in the communication system, and therefore may vary depending on the network.

Figure 4:
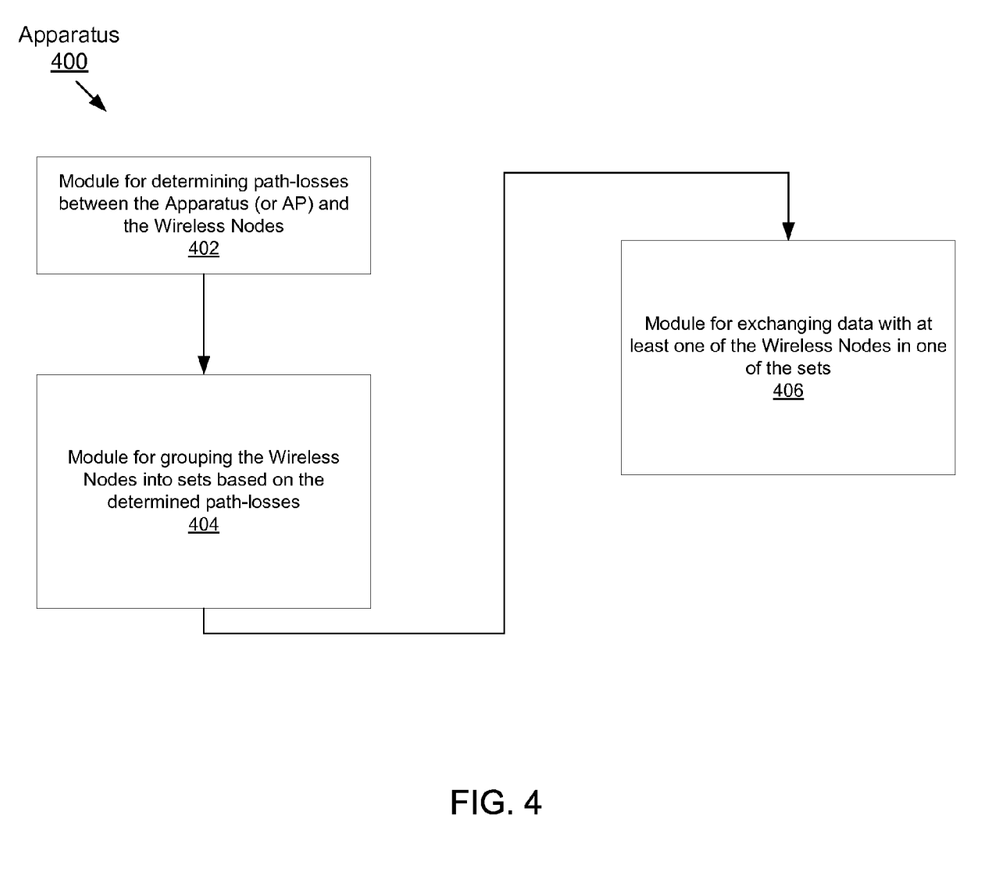
FIG. 4 is a conceptual block diagram illustrating the functionality of an exemplary apparatus.

FIG. 4 is a conceptual block diagram illustrating the functionality of an exemplary apparatus. The apparatus 400 includes a module 402 for determining path-losses between the apparatus and a plurality of wireless nodes, a module 404 for grouping the plurality of wireless nodes into sets based on the determined path-losses, and a module 406 for exchanging data with at least one of the wireless nodes in one of the sets.

Figure 5:
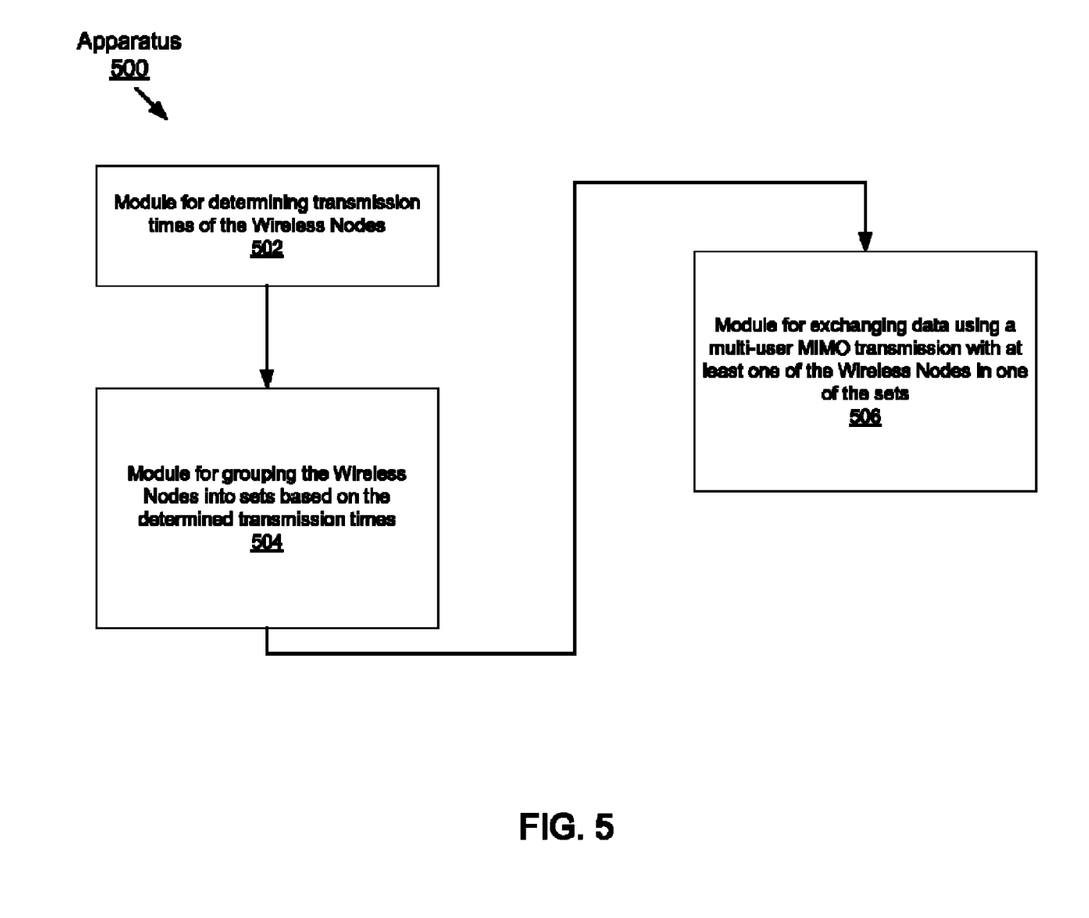
FIG. 5 is a conceptual block diagram illustrating the functionality of an exemplary apparatus.

FIG. 5 is a conceptual block diagram illustrating the functionality of an exemplary apparatus. The apparatus 500 a module 502 for determining transmission times of a plurality of wireless nodes, a module 504 for grouping the plurality of wireless nodes into sets based on the determined transmission times, and a module 506 for exchanging data using a multi-user multiple-input and multiple-output transmission with at least one of the wireless nodes in one of the sets, wherein the plurality of wireless nodes are grouped into sets such that each of the sets comprises wireless nodes with approximately equal transmissions times.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus for wireless communications, comprising:
a transmitter; and
a processing system configured to:
  determine transmission times of a plurality of wireless nodes, wherein the transmission time for each of the plurality of wireless nodes is the amount of time for the wireless node to receive data;
  group the plurality of wireless nodes into sets based on the determined transmission times such that each of the sets comprises wireless nodes with equal transmissions times; and
  exchange data using a multi-user multiple-input and multiple-output transmission simultaneously with wireless nodes in at least one of the sets.

2. The apparatus of claim 1, wherein the processing system is further configured to group the plurality of wireless nodes into sets such that each of the sets comprises wireless nodes with a similar traffic class.

3. The apparatus of claim 1, wherein the processing system is further configured to group the plurality of wireless nodes into sets such that each of the sets comprises wireless nodes with quality of service requirements and path-losses that provide for equal transmission times.

4. The apparatus of claim 1, wherein the processing system is further configured to group the plurality of wireless nodes into sets such that each of the sets comprises wireless nodes with a number of receive antennas and quality of service requirements that provide for equal transmission times.

5. The apparatus of claim 1, wherein to exchange data, the processing system is configured to provide the data to a transmitter to transmit to said wireless nodes in said at least one of the sets.

6. The apparatus of claim 5, wherein for each of the sets, the processing system is further configured to allocate a power for transmission such that transmission times are equal for the wireless nodes in each of the sets.

7. The apparatus of claim 5, wherein the processing system is further configured to group the plurality of wireless nodes into sets such that each of the sets comprises wireless nodes that require equal transmit power allocation from the transmitter.

8. The apparatus of claim 1, wherein to exchange data, the processing system is configured to receive the data from a receiver from said wireless nodes in said at least one of the sets.

9. The apparatus of claim 8, wherein the processing system is further configured to group the plurality of wireless nodes into sets such that each of the sets comprises wireless nodes that, when transmitting, result in an equal received power at the receiver.

10. A method of wireless communications, comprising:
determining transmission times of a plurality of wireless nodes, wherein the transmission time for each of the plurality of wireless nodes is the amount of time for the wireless node to receive data;
grouping, by an apparatus, the plurality of wireless nodes into sets based on the determined transmission times such that each of the sets comprises wireless nodes with equal transmissions times; and
exchanging data using a multi-user multiple-input and multiple-output transmission simultaneously with wireless nodes in at least one of the sets.

11. The method of claim 10, further comprising grouping the plurality of wireless nodes into sets such that each of the sets comprises wireless nodes with a similar traffic class.

12. The method of claim 10, further comprising grouping the plurality of wireless nodes into sets such that each of the sets comprises wireless nodes with quality of service requirements and path-losses that provide for equal transmission times.

13. The method of claim 10, further comprising grouping the plurality of wireless nodes into sets such that each of the sets comprises wireless nodes with a number of receive antennas and quality of service requirements that provide for equal transmission times.

14. The method of claim 10, wherein the exchanging the data comprises providing the data to a transmitter to transmit to said wireless nodes in said at least one of the sets.

15. The method of claim 14, further comprising allocating for each of the sets a power for transmission such that transmission times are approximately equal for the wireless nodes in each of the sets.

16. The method of claim 14, further comprising grouping the plurality of wireless nodes into sets such that each of the sets comprises wireless nodes that require equal transmit power allocation from the transmitter.

17. The method of claim 10, wherein the exchanging the data comprises receiving the data from a receiver from said wireless nodes in said at least one of the sets.

18. The method of claim 17, further comprising grouping the plurality of wireless nodes into sets such that each of the sets comprises wireless nodes that, when transmitting, result in an equal received power at the receiver.

19. An apparatus for wireless communications, comprising:
  means for determining transmission times of a plurality of wireless nodes, wherein the transmission time for each of the plurality of wireless nodes is the amount of time for the wireless node to receive data;
  means for grouping the plurality of wireless nodes into sets based on the determined transmission times such that each of the sets comprises wireless nodes with equal transmissions times; and
  means for exchanging data using a multi-user multiple-input and multiple-output transmission simultaneously with wireless nodes in at least one of the sets.

20. A computer program product for wireless communications comprising a computer-readable storage device comprising instructions that, when executed, direct an apparatus to:
  determine transmission times of a plurality of wireless nodes, wherein the transmission time for each of the plurality of wireless nodes is the amount of time for the wireless node to receive data;
  group the plurality of wireless nodes into sets based on the determined transmission times such that each of the sets comprises wireless nodes with equal transmissions times; and
  exchange data using a multi-user multiple-input and multiple-output transmission simultaneously with wireless nodes in at least one of the sets.

21. The apparatus of claim 1, wherein the apparatus is an access point.

* * * * *